United States Patent [19]

Hartmann

[11] Patent Number: 5,631,781
[45] Date of Patent: May 20, 1997

[54] OUTSIDE MIRROR FOR A MOTOR VEHICLE

[76] Inventor: Helmut Hartmann, Ringstrasse 29, D-36151 Burghaun, Germany

[21] Appl. No.: 388,036

[22] Filed: Feb. 14, 1995

[30] Foreign Application Priority Data

Feb. 14, 1994 [DE] Germany .................. 94 02 385 U

[51] Int. Cl.$^6$ .................. G02B 5/08; G02B 7/182; B60R 1/06
[52] U.S. Cl. .................. 359/865; 359/872; 359/873; 359/874; 359/877; 248/480; 248/485
[58] Field of Search .................. 359/850, 855, 359/864, 865, 866, 872, 873, 874, 876, 877, 881; 248/480, 485

[56] References Cited

U.S. PATENT DOCUMENTS

| | | |
|---|---|---|
| 4,678,294 | 7/1987 | Van Nostrand .................. 359/864 |
| 4,715,701 | 12/1987 | Urban . | |
| 4,929,074 | 5/1990 | Urban .................. 359/864 |
| 4,932,770 | 6/1990 | Caravaty . | |
| 5,052,792 | 10/1991 | McDonough .................. 359/866 |
| 5,115,352 | 5/1992 | do Espirito Santo .................. 359/865 |
| 5,295,021 | 3/1994 | Swanson .................. 359/865 |

FOREIGN PATENT DOCUMENTS

| | | |
|---|---|---|
| 0028860 | 5/1981 | European Pat. Off. . |
| 0443990 | 8/1991 | European Pat. Off. . |
| 2650982 | 2/1991 | France . |
| 24 09 748 | 9/1975 | Germany . |
| 33 02 735 | 8/1984 | Germany . |
| 38 06 579 | 9/1989 | Germany . |
| 39 31 485 | 4/1991 | Germany . |
| 2223724 | 4/1990 | United Kingdom . |

*Primary Examiner*—Ricky D. Shafer
*Attorney, Agent, or Firm*—Evenson, McKeown, Edwards & Lenahan P.L.L.C.

[57] ABSTRACT

An outside mirror for a motor vehicle. The mirror glass 4 is divided by an approximately horizontally extending separating line 7 into an upper mirror surface 5 and a lower mirror surface 6. The mirror surface 5 which cannot be swivelled about the approximately vertically extending axis 9 is constructed to be swivellable about an axis 8 which extends approximately horizontally in the proximity of the separating line 7. As a result, it is possible during a passing maneuver to view the rearward traffic over a long distance.

13 Claims, 1 Drawing Sheet

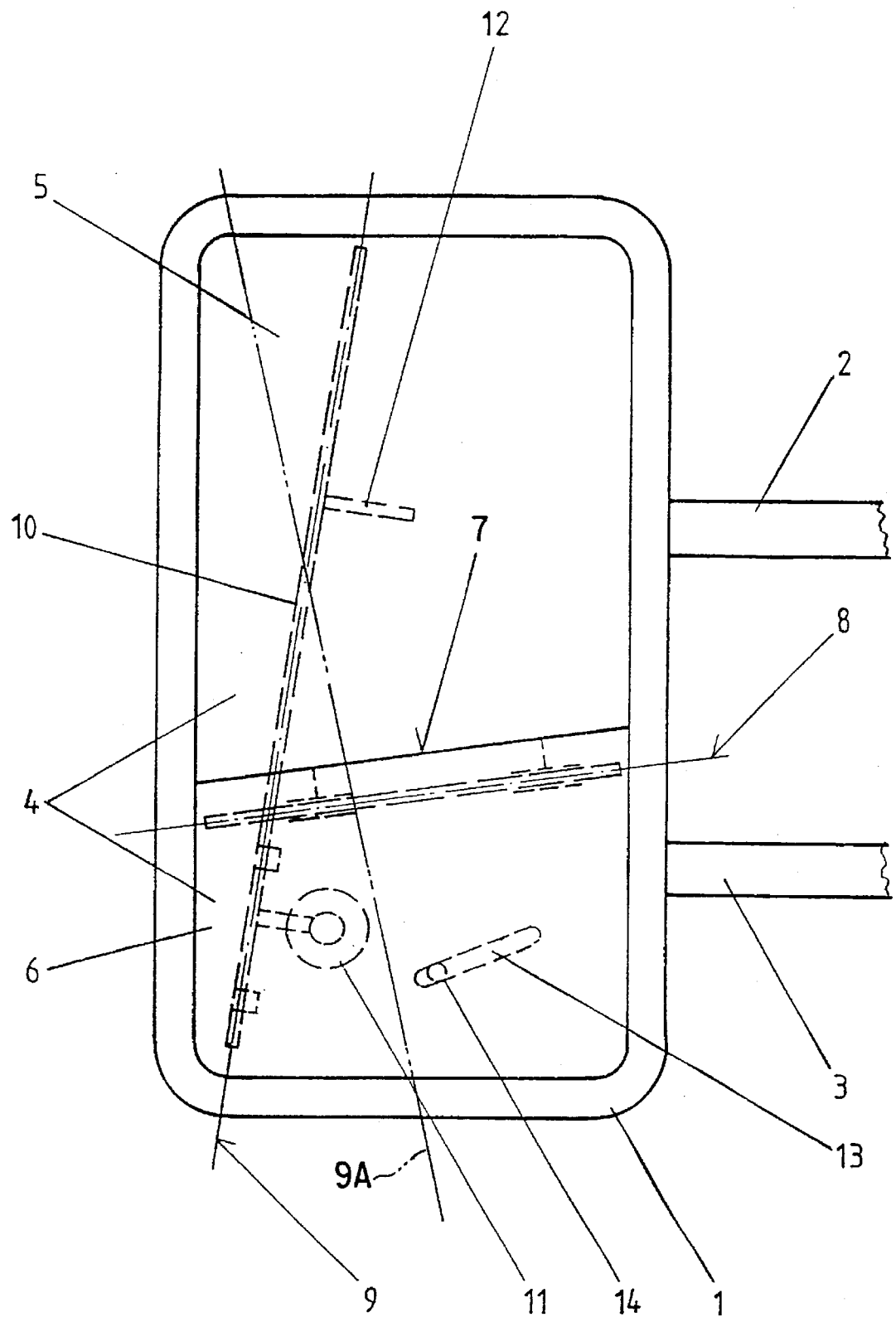

OUTSIDE MIRROR FOR A MOTOR VEHICLE

BACKGROUND OF THE INVENTION

This invention relates to an outside mirror for a motor vehicle, comprising a mirror glass divided into two mirror surfaces in a mirror housing as well as comprising a motor operator for the swivelling of one mirror surface about an axis which extends approximately vertically and is offset toward the outside with respect to an inner edge of the mirror surface.

An outside mirror of the above-mentioned type is the object of British Patent Document GB-A-22 23 724. In the case of the known mirror, the mirror glass is divided by means of an approximately vertically extending separating line into a inside and a outside mirror surface. When the direction indicator is activated, the outside mirror surface tilts about the vertical axis so that its most extreme edge moves toward the front. This enables the driver of the vehicle to observe, before a lane change, by means of this swivellable mirror surface, an area behind his vehicle which is much farther to the side than in the case of a mirror surface which is not swivelled.

However, outside mirrors of the above-mentioned type have not been accepted in practice although accidents during passing maneuvers are very common because the person pulling out did not see a vehicle passing him which was in his blind spot, so that there is an urgent demand for an outside mirror which permits the monitoring of the blind spot.

Particularly in the case of trucks, the known outside mirror does not permit a sufficient monitoring of the blind spot because a vehicle which is situated close to the truck and is laterally offset with respect to it is not only situated farther to the outside but also at a more diagonally downwardly directly angle with respect to the driver than a vehicle driving at a greater distance from the truck. A passenger car which is starting to pass a truck may therefore be situated not only laterally of the viewing range of a mirror but also below this viewing range.

SUMMARY OF THE INVENTION

The invention is based on the problem of designing an outside mirror of the initially mentioned type in such a manner that, before a passing maneuver, an observation of the rearward traffic is possible which is as extensive as possible.

According to the invention, this problem is solved in that the mirror glass is divided, by means of an approximately horizontally extending separating line, into an upper mirror surface and a lower mirror surface. One of the mirror surfaces cannot be swivelled about the approximately vertically extending axis, but is so constructed so that it can be swivelled about an axis which extends approximately horizontally in the proximity of the separating line.

In contrast to the prior, both mirror surfaces swivel in the case of such an outside mirror. As a result, for monitoring the rearward traffic, it becomes possible to see not only into an area which is situated farther to the side but also into an area which deviates with respect to the height. Practical tests by means of the mirror according to the invention have shown that the mirror makes it possible for the driver before a passing maneuver to convince himself without turning around that the left driving lane is in fact free. Since, according to the invention, an upper or a lower mirror surface of the mirror glass is swivelled about an approximately vertically situated axis, if the other mirror surface were constructed to be stationary, the upward view or the downward view by means of it would not be as far. However, because of the invention, this can be alleviated by the fact that the mirror surface which cannot be swivelled about an approximately vertical axis is swivelled about an approximately horizontal axis and by means of it, the view is extended in the downward and in the upward direction.

The swivellability of the two mirror surfaces may be provided in different ways. The outside mirror is designed to have a particularly simple construction when, according to an advantageous aspect of the invention, the approximately vertically extending axis is formed by a shaft which is non-rotatably connected with the mirror surface which can be swivelled about it and is rotatably disposed in the mirror housing, the motor operator being applied to this shaft.

The outside mirror requires only a single motor operator for swivelling both mirror surfaces if, according to another aspect of the invention, the shaft leads to behind the mirror surface which can be swivelled about an approximately horizontal axis and, behind this mirror surface, has a radial finger for swivelling this mirror surface about its approximately horizontal axis.

In their non-swivelled basic position, the mirror surfaces can be in direct contact with one another at the mutually facing edges without any interfering effect of these edges during the swivelling if the mirror surface, which can be swivelled about the approximately vertically extending axis, is arranged to be slidable in the vertical direction and has on its rear side a connecting-link guide which rises from the outside to the inside and into which a sliding block of the mirror housing engages. As a result of this design, one mirror surface will slightly move away from the other mirror surface during the swivel movement so that the required space is created for the tilting of the edges of the mirror surfaces.

The swivelling of the mirror surfaces during the setting and return of the direction indicator takes place particularly rapidly if the motor operator is a solenoid.

For outside mirrors arranged at a high level, thus, for outside mirrors of trucks, an embodiment of the invention is advantageous in which the mirror surface which can be swivelled about the approximately vertically extending axis forms a lower, smaller area of the mirror glass.

For a passenger car, it was found to be expedient for the mirror surface which can be swivelled about the approximately vertically extending axis to form an upper smaller area of the mirror glass.

For a high vehicle, it is also advantageous for the approximately vertically extending axis on the mirror top side to have a smaller lateral distance from the motor vehicle than the mirror bottom side. As a result, in the case of a truck or bus, during the swivelling-out, the lower mirror surface is tilted in such a manner that, by means of it, the view is extended not only farther to the side but also farther to the rear.

In contrast to the above-mentioned embodiment, it is advantageous in the case of low vehicles, therefore in the case of passenger cars, for the approximately vertically extending axis on the mirror top side to have a larger lateral distance from the motor vehicle than on the mirror bottom side so that, also by means of the swivelled-out mirror surface, an area can be observed which is situated farther in the background.

BRIEF DESCRIPTION OF THE DRAWING

The invention permits numerous embodiments. For a further explanation of its basic principle, the drawing shows, a left outside mirror of a motor vehicle in a very schematic manner which will be described in the following description of a preferred embodiment.

DESCRIPTION OF A PREFERRED EMBODIMENT

The illustrated outside mirror has a mirror housing 1 comprising two partially shown fastening arms 2, 3. In the mirror housing 1 a mirror glass 4 is arranged which consists of two separate mirror surfaces 5, 6 which are separated from one another by a separating line 7. This separating line 7 may extend to be horizontal or slightly sloped, which is illustrated in the drawing.

It is important for the invention that the upper mirror surface 5 can be swivelled about an axis 8 which extends also horizontally or is slightly sloped with respect to the horizontal line so that, during the swivelling, the upper edge of the mirror surface 5 moves out of the plane of the drawing. The lower mirror surface 6 can be swivelled about an axis 9 which is slightly inclined with respect to the vertical line. As a result, in this case, during the swivelling, the right mirror edge moves out of the plane of the drawing.

For simplifying the representation, the parts of the outside mirror which are arranged behind the mirror glass 4 are also visible in the drawing. The axis 9 of the outside mirror is formed by a shaft 10 which is rotatably arranged in the mirror housing 1 and which can be rotated by means of a motor operator 11 which is constructed as a solenoid and is also arranged in the mirror housing 1. The approximately vertically extending axis may have a smaller lateral distance from the motor vehicle on the mirror top side than on the mirror bottom side, as shown by axis 9. Alternatively, the approximately vertically extending axis may have a larger lateral distance from the motor vehicle on the mirror top side than on the mirror bottom side, as shown by axis 9A. This shaft 10 reaches upward behind the mirror surface 5 and has a finger 12 there which, when the shaft 10 is swivelled, presses against the rear side of the mirror surface 5 and therefore swivels this mirror surface about the axis 8. The return movement takes place by means of a tension spring, which is not shown, between the mirror surface 5 and the mirror housing 1.

On its rear side, the mirror surface 6 has a connecting link guide 13 which slopes when viewed from the inside to the outside and into which a stationary sliding block 14 of the mirror housing 1 engages. In addition, the mirror surface 6 is slidable on the shaft 10 in the longitudinal direction of the shaft 10 but participates in its rotational movement. When the mirror surface 6 swivels toward the outside, the connecting link guide 13 will slide by way of the sliding block 14. As a result of the diagonal course of the connecting link guide 13, the mirror surface 6 is slid downward.

An outside mirror for a passenger car, which differs from an outside rear view mirror for a truck mainly because of the fact that it is significantly wider than high and plane, is not shown. In the case of such an outside mirror, it is expedient for the mirror surface which is swivellable about the approximately vertically extending axis to form an upper smaller area of the mirror glass.

What is claimed is:

1. An outside mirror for a motor vehicle comprising a mirror glass divided along an approximately horizontally extending separating line into an upper mirror surface and a lower mirror surface in a mirror housing, one of said mirror surfaces being swivellable about an axis which extends approximately vertically the other of said mirror surfaces being swivellable about an axis which extends approximately horizontally in the proximity of the separating line, a shaft rotatably disposed n the mirror housing and defining said approximately vertically extending axis, said shaft operably interacting with each of said mirror surfaces, and a motor operator operably connected to said shaft for simultaneously swivelling said mirror surfaces about their respective axes.

2. An outside mirror according to claim 1, wherein said shaft is non-rotatably connected with said one mirror surface which is swivellable about said approximately vertically extending axis.

3. An outside mirror according to claim 2, wherein said shaft leads to behind said other mirror surface and has a radial finger located behind said other mirror surface for swivelling said other mirror surface about said approximately horizontally extending axis.

4. An outside mirror according to claim 1, wherein said one mirror surface is slidable in the vertical direction and has on its rear side a diagonal slot which rises from the outside toward the inside and into which a sliding block of the mirror housing engages.

5. An outside mirror according to claim 1, wherein the motor operator is a solenoid.

6. An outside mirror according to claim 1, wherein said one mirror surface forms a lower smaller area of the mirror glass.

7. An outside mirror according to claim 1, wherein said one mirror surface forms an upper smaller area of the mirror glass.

8. An outside mirror according to claim 1, wherein the approximately vertically extending axis on the mirror top side has a smaller lateral distance from the vehicle than on the mirror bottom side.

9. An outside mirror according to claim 1, wherein the approximately vertically extending axis on the mirror top side has a larger lateral distance from the motor vehicle than on the mirror bottom side.

10. An outside mirror according to claim 1, wherein said shaft leads to behind said other mirror surface and has a radial finger located behind said other mirror surface for swivelling said other mirror surface about said approximately horizontally extending axis.

11. An outside mirror according to claim 1, wherein said shaft is rotatable with respect to said other mirror surface.

12. An outside mirror for a motor vehicle comprising a mirror glass divided along an approximately horizontally extending separating line into an upper mirror surface and a lower mirror surface in a mirror housing, means for swivelling one of said mirror surfaces about an axis which extends approximately vertically and is offset toward the outside with respect to an inner edge of the mirror surface, means for swivelling the other of said mirror surfaces about an axis which extends approximately horizontally in the proximity of the separating line, and a motor operator operably connected to at least one of said mirror surfaces for swivelling the same, wherein the approximately vertically extending axis on the mirror top side has a smaller lateral distance from the vehicle than on the mirror bottom side.

13. An outside mirror for a motor vehicle comprising a mirror glass divided along an approximately horizontally extending separating line into an upper mirror surface and a lower mirror surface in a mirror housing, means for swivelling one of said mirror surfaces about an axis which extends approximately vertically and is offset toward the outside with respect to an inner edge of the mirror surface, means for swivelling the other of said mirror surfaces about an axis which extends approximately horizontally in the proximity of the separating line, and a motor operator operably connected to at least one of said mirror surfaces for swivelling the same, wherein the approximately vertically extending axis on the mirror top side has a larger lateral distance from the motor vehicle than on the mirror bottom side.

* * * * *